United States Patent
Niigata

(10) Patent No.: US 8,130,779 B2
(45) Date of Patent: Mar. 6, 2012

(54) SWITCH DEVICE, STORAGE SYSTEM, AND ROUTING METHOD DETERMINING OUTPUT PORT FOR A FRAME BASED ON HOP COUNT

(75) Inventor: Katsuya Niigata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 76 days.

(21) Appl. No.: 12/385,212

(22) Filed: Apr. 1, 2009

(65) Prior Publication Data

US 2009/0296705 A1 Dec. 3, 2009

(30) Foreign Application Priority Data

Jun. 3, 2008 (JP) .................................. 2008-145983

(51) Int. Cl.
*H04L 12/56* (2006.01)
(52) U.S. Cl. ........................................ 370/422; 709/238
(58) Field of Classification Search .................. None
See application file for complete search history.

(56) References Cited

U.S. PATENT DOCUMENTS

| | | | |
|---|---|---|---|
| 6,496,503 B1* | 12/2002 | Pelissier et al. | 370/389 |
| 6,546,010 B1* | 4/2003 | Merchant et al. | 370/389 |
| 6,934,283 B1* | 8/2005 | Warner | 370/380 |
| 7,167,441 B2* | 1/2007 | Donoghue et al. | 370/216 |
| 7,564,789 B2* | 7/2009 | Betker | 370/235 |
| 7,668,925 B1* | 2/2010 | Liao et al. | 709/212 |
| 2005/0100010 A1* | 5/2005 | Jain et al. | 370/389 |
| 2005/0210067 A1 | 9/2005 | Nakatani et al. | |
| 2005/0226265 A1 | 10/2005 | Takatori | |
| 2009/0125655 A1* | 5/2009 | Jones et al. | 710/104 |
| 2009/0222623 A1* | 9/2009 | Nakamura et al. | 711/114 |

FOREIGN PATENT DOCUMENTS

| | | |
|---|---|---|
| JP | 61-224061 | 10/1986 |
| JP | 61-275953 | 12/1986 |
| JP | 63-175552 | 7/1988 |
| JP | 01-297755 | 11/1989 |
| JP | 3-196737 | 8/1991 |
| JP | 03-225544 | 10/1991 |
| JP | 2001-156819 | 6/2001 |
| JP | 2002-278910 | 9/2002 |
| JP | 2005-267327 | 9/2005 |
| JP | 2007-531397 | 11/2007 |
| JP | 4034782 | 11/2007 |
| WO | WO 2005/104447 | 11/2005 |

OTHER PUBLICATIONS

Japanese Office Action mailed Feb. 2, 2010 in corresponding Japanese Patent Application 2008-145983.
JPO correspondence mailed on Aug. 17, 2010 in connection with Japanese patent application No. 2208-145983. Partial English translation provided.

\* cited by examiner

*Primary Examiner* — Brian Roberts
(74) *Attorney, Agent, or Firm* — Fujitsu Patent Center

(57) ABSTRACT

A switch device includes two cascade ports each connected to another switch device; at least one direct port connected to a storage medium; a hop-count determining unit that determines whether a frame input from one cascade port has already gone through a predetermined number of switch devices; an output unit that outputs the frame from another cascade port when it is determined that the frame has not gone through the predetermined number of switch devices; and a port determining unit that determines a direct port for outputting the frame when it is determined that the frame has already gone through the predetermined number of switch devices.

21 Claims, 8 Drawing Sheets

| DISK | HOP COUNT |
|---|---|
| DISK $D_{11}$ | 3 |
| DISK $D_{12}$ | 3 |
| ⋮ | ⋮ |
| DISK $D_{mn}$ | 4 |

FIG.5

| TRANSMISSION DESTINATION ADDRESS | PORT |
|---|---|
| COMPUTING APPARATUS 100-1 | C PORT 311 |
| COMPUTING APPARATUS 100-2 | C PORT 311 |
| DISK 322-1 | D PORT 316-1 |
| ⋮ | ⋮ |
| DISK 322-n | D PORT 316-n |
| DISK $D_{11}$ | C PORT 313 |
| DISK $D_{12}$ | C PORT 313 |
| ⋮ | ⋮ |

FIG.6

| COMPUTING APPARATUS | HOP COUNT |
|---|---|
| COMPUTING APPARATUS 100-1 | 2 |
| COMPUTING APPARATUS 100-2 | 2 |

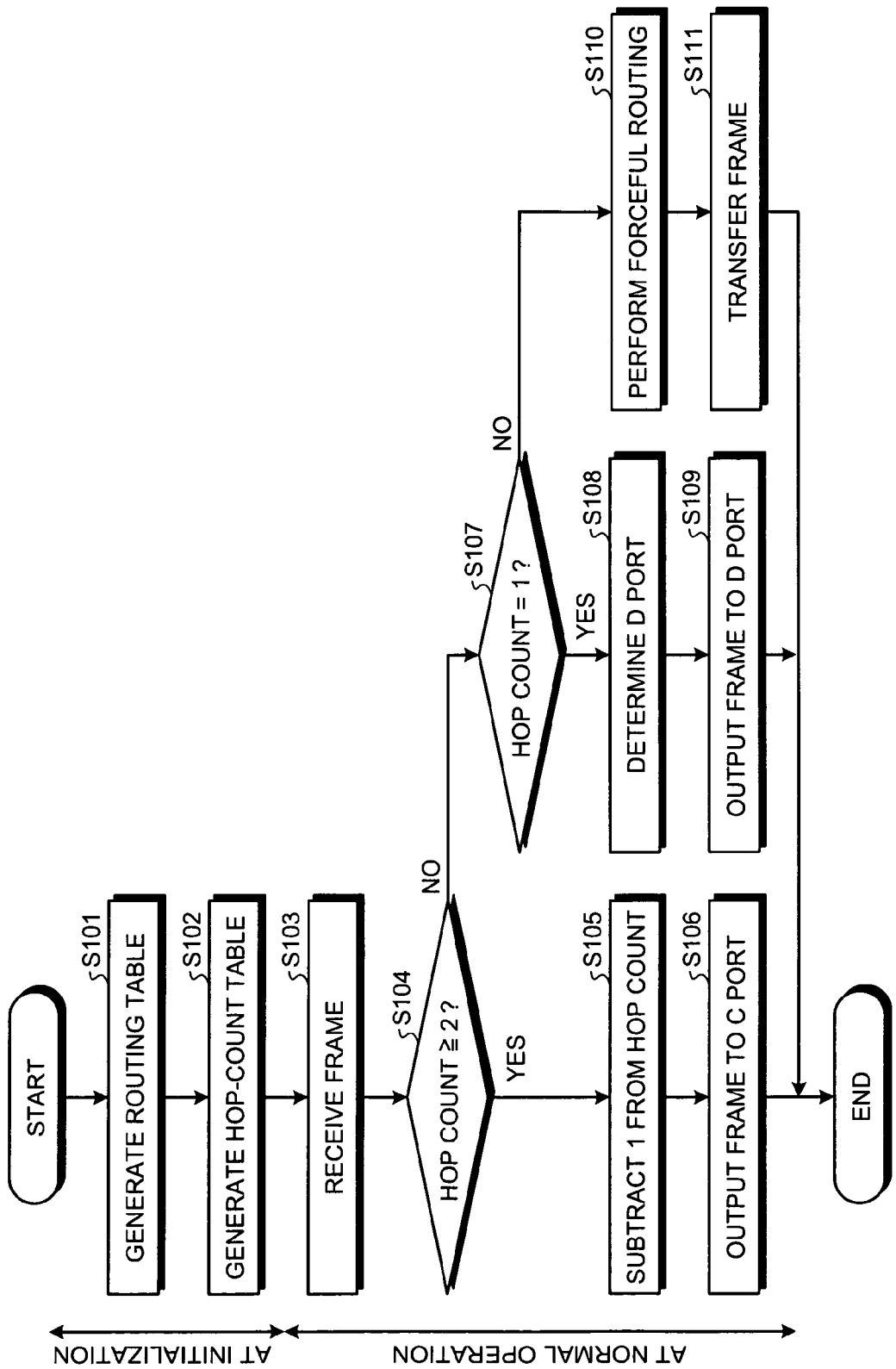

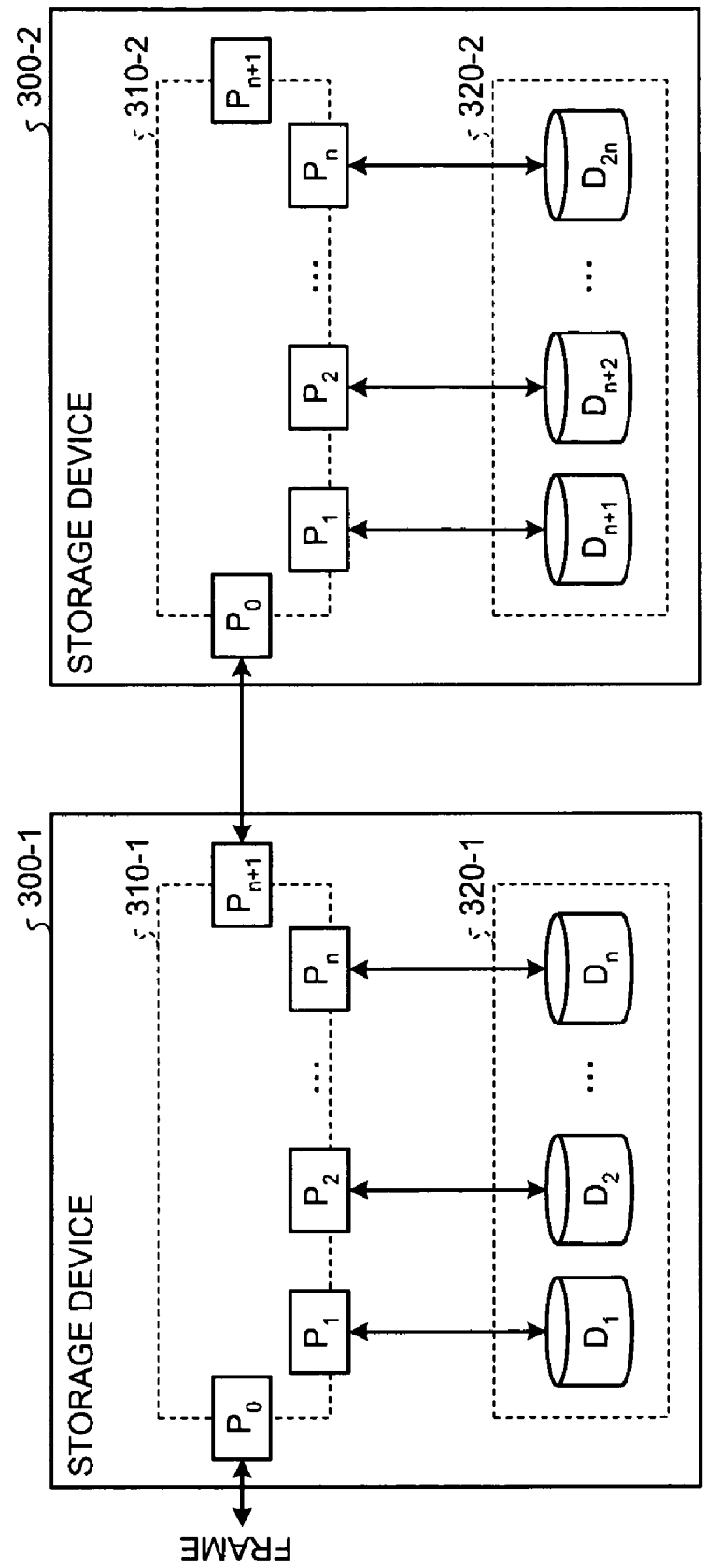

FIG.9

ROUTING TABLE FOR SWITCH 310-1

| TRANSMISSION DESTINATION ADDRESS | PORT |
|---|---|
| COMPUTING APPARATUS | PORT $P_0$ |
| DISK $D_1$ | PORT $P_1$ |
| DISK $D_2$ | PORT $P_2$ |
| ⋮ | ⋮ |
| DISK $D_n$ | PORT $P_n$ |
| DISK $D_{n+1}$ | PORT $P_{n+1}$ |
| DISK $D_{n+2}$ | PORT $P_{n+1}$ |
| ⋮ | ⋮ |
| DISK $D_{2n}$ | PORT $P_{n+1}$ |

- 501: COMPUTING APPARATUS row
- 502: DISK $D_1$ through DISK $D_n$
- 503: DISK $D_{n+1}$ through DISK $D_{2n}$

ROUTING TABLE FOR SWITCH 310-2

| TRANSMISSION DESTINATION ADDRESS | PORT |
|---|---|
| COMPUTING APPARATUS | PORT $P_0$ |
| DISK $D_1$ | PORT $P_0$ |
| DISK $D_2$ | PORT $P_0$ |
| ⋮ | ⋮ |
| DISK $D_n$ | PORT $P_0$ |
| DISK $D_{n+1}$ | PORT $P_1$ |
| DISK $D_{n+2}$ | PORT $P_2$ |
| ⋮ | ⋮ |
| DISK $D_{2n}$ | PORT $P_n$ |

- 511: COMPUTING APPARATUS row
- 512: DISK $D_1$ through DISK $D_n$
- 513: DISK $D_{n+1}$ through DISK $D_{2n}$

SWITCH DEVICE, STORAGE SYSTEM, AND ROUTING METHOD DETERMINING OUTPUT PORT FOR A FRAME BASED ON HOP COUNT

CROSS-REFERENCE TO RELATED APPLICATION

This application is based upon and claims the benefit of priority of the prior Japanese Patent Application No. 2008-145983, filed on Jun. 3, 2008, the entire contents of which are incorporated herein by reference.

FIELD

The embodiments discussed herein are directed to switch devices, storage systems, and routing methods.

BACKGROUND

In recent years, storage systems achieving large-capacity data storage by using a plurality of storage media have been widespread. In such a storage system, between a computing apparatus, such as a server that processes data or a storage controller, and a storage medium, such as a hard disk drive that stores data, a network is constructed with switches and cables. With a frame containing data and commands being communicated over the network between the computing apparatus and the storage medium, data is read and written. At this time, as an initiator, the computing apparatus transmits a command to a storage device serving as a target for writing or reading data. That is, the computing apparatus takes the initiative in processing in the storage system, whilst the storage medium operates in a passive manner.

Meanwhile, the switches provided between the computing apparatus and the storage medium each include ports connecting to the computing apparatus, the storage medium, or other switches. A port is an interface complying with, for example, Serial attached SCSI (SAS) standard. A frame transmitted from the computing apparatus or the storage device is transferred via the ports of the switches. That is, each switch switches an output port of the input frame to control a frame transfer route.

Ports included in a switch are broadly classified into two types, a direct port and a cascade port. The direct port is a port directly connecting to the computing apparatus or a storage medium under the direct port. The cascade port is a port connecting to another switch. Therefore, the frame transmitted from the computing apparatus or the storage device is input to a switch of the first stage via a direct port, and is then output to another switch via a cascade port. The frame is then transferred by several switches, and is eventually output from a direct port of the switch connecting to a storage device or a computing apparatus, which is the transmission destination of the frame.

In frame transfer with such switches, a routing table is generally referred to. The routing table is a table generated at each switch separately at initialization of the network or the like, having stored therein a correspondence between the transmission destination address and the output port of the frame. That is, the routing table has stored therein from which port in the switch the frame is to be output for transfer the frame to the transmission destination address. When a frame is input, the switch checks the transmission destination address from the header portion of the frame, and then searches the routing table for an output port corresponding to the transmission destination address. The switch then causes the frame to be output from the output port determined through searching of the routing table.

Such a conventional technology is exemplarily disclosed in Japanese Laid-open Patent Publication No. 2005-267327.

However, in routing of the frame by the switches, it takes time for each switch to refer to the routing table to determine an output port, disadvantageously delaying writing of data in a storage medium or reading of data from a storage medium. Normally, for the address of every computing apparatus and storage medium in the storage system, the routing table has stored therein a corresponding output port. Therefore, to refer to the routing table to determine an output port, the switch is required to search many addresses for an address matching the transmission destination address of the frame. Since such a search is performed at every switch on a route from the transmission source to the transmission destination of the frame, a delay occurs when the frame is transferred to its transmission destination.

Moreover, in recent years, with downsizing of hard disk drives, for example, a larger number of storage media can be incorporated in a single storage system. Thus, the routing table has to have stored therein a correspondence between many addresses and output ports, and therefore the size of the routing table tends to be increased. As a result, more time is required to search for an address that matches the transmission destination address of the frame, increasing delays in frame transfer in the switch.

SUMMARY

According to an aspect of the invention, a switch device includes two cascade ports each connected to another switch device; at least one direct port connected to a storage medium that is under the switch device; a hop-count determining unit that determines whether a frame input from one cascade port has already gone through a predetermined number of switch devices placed on a transfer route from a transmission source to a transmission destination of the frame; an output unit that outputs the frame from another cascade port when it is determined by the hop-count determining unit that the frame has not gone through the predetermined number of switch devices; and a port determining unit that determines a direct port for outputting the frame when it is determined by the hop-count determining unit that the frame has already gone through the predetermined number of switch devices.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a drawing of an example of a routing table according to the embodiment;

FIG. 6 is a drawing of an example of another hop-count table according to the embodiment;

FIG. 7 is a flow diagram of the operation of a switch according to the embodiment;

FIG. 8 is a drawing that schematically depicts a connection of storage devices according to the embodiment;

FIG. 9 is a drawing of a routing table according to the switch of FIG. 8; and

DESCRIPTION OF EMBODIMENTS

Preferred embodiments of the present invention will be explained with reference to the accompanying drawings. In the following, a storage system is explained in which a plurality of computing apparatuses and a plurality of storage media are connected to each other via switches. Also, although a frame is bidirectionally transmitted and received between a computing apparatus and a storage medium in the storage system according to the present embodiment, a case is mainly explained herein where a frame is transmitted from a computing apparatus to a storage medium. The present invention can be similarly applied to a case where a frame is transmitted from a storage medium to a computing apparatus.

Figure 1:
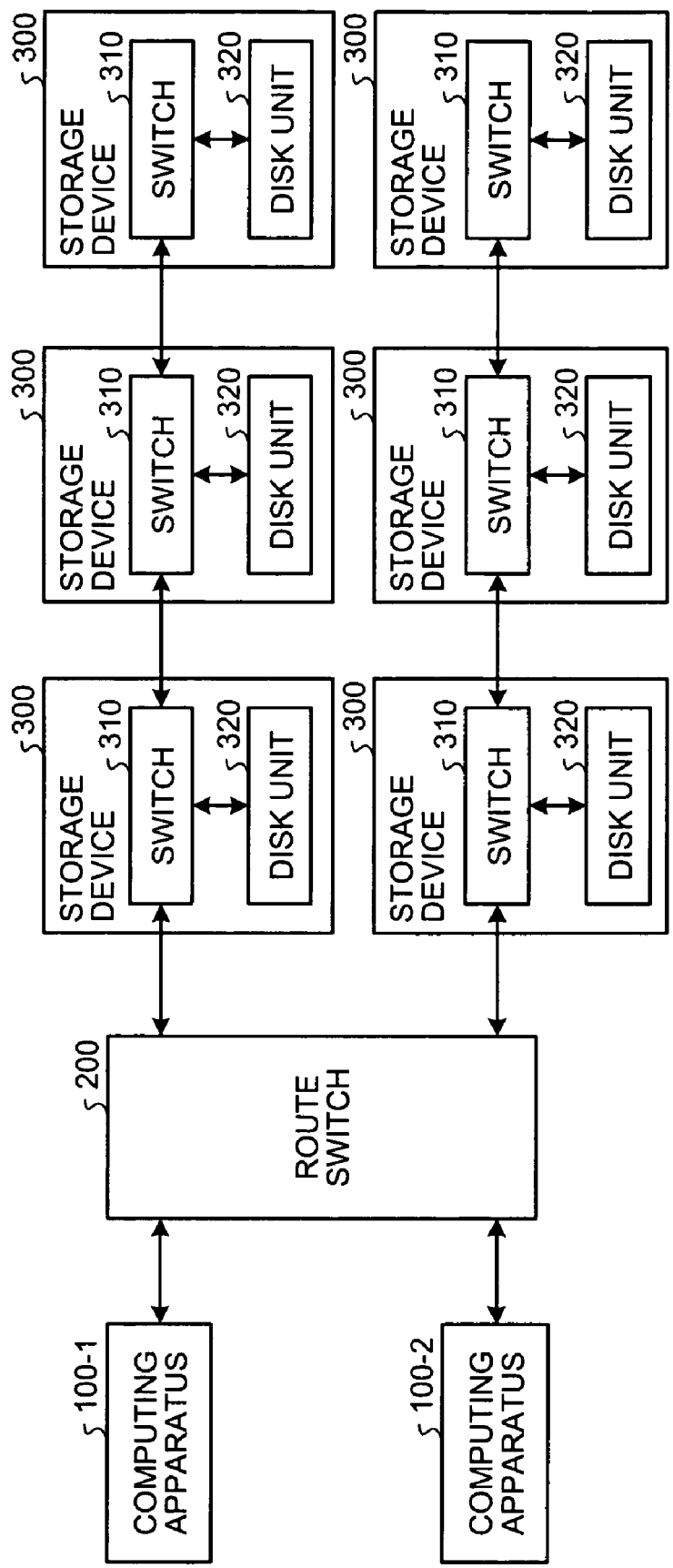
FIG. 1 is a block diagram of a schematic configuration of a storage system according to an embodiment.

FIG. 1 is a block diagram of a schematic configuration of a storage system according to the present embodiment. In the storage system depicted in the drawing, computing apparatuses 100-1 and 100-2 are connected via a route switch 200 to a plurality of storage devices 300. Each of the storage devices 300 includes a switch 310 and a disk unit 320.

The computing apparatuses 100-1 and 100-2 store a command for writing data in the disk unit 320 of the storage device 300 and the data itself in a frame for transmission, and also store a command for reading data from the disk unit 320 of the storage device 300 for transmission. At this time, as a transmission destination address, the computing apparatuses 100-1 and 100-2 store in the header portion of a frame an address of a storage medium included in the disk unit 320 as a frame transmission destination.

Also, as a hop count, the computing apparatuses 100-1 and 100-2 store in the header portion of the frame the number of switches (the route switch 200 and the switches 310) on a route to the storage medium in the disk unit 320 as the frame transmission destination. At this time, the computing apparatuses 100-1 and 100-2 refer to a hop-count table generated at initialization of the network, for example, to store the hop count corresponding to the frame transmission destination in the header portion of the frame. That is, the computing apparatuses 100-1 and 100-2 refer to the routing table generated at each switch 310 at initialization of the network, for example, to generate a hop-count table exemplarily as depicted in FIG. 2.

Figures 2, 3:
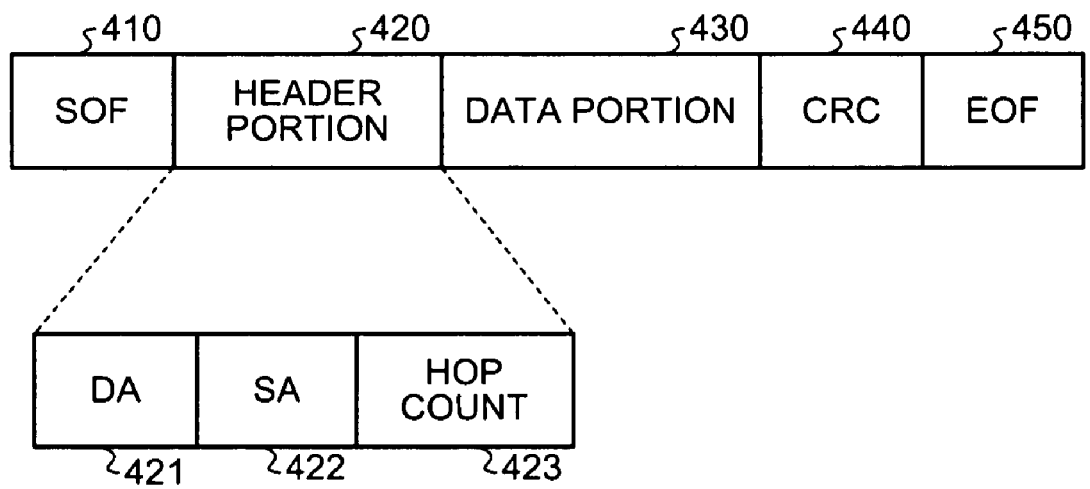
FIG. 2 is a drawing of an example of a hop-count table according to the embodiment.
FIG. 3 is a drawing of an example of a frame structure according to the embodiment.

Here, for example, when the computing apparatus 100-1 generates a hop-count table depicted in FIG. 2, it can be found that three switches are present including the route switch 200 between the computing apparatus 100-1 and a disk $D_{11}$ in any disk unit 320. Similarly, between the computing apparatus 100-1 and a disk $D_{mn}$, four switches are present. Such a hop-count table can be generated by the computing apparatuses 100-1 and 100-2 knowing from the routing table a connecting relation between the switches 310 and the storage media in the disk units 320 in the entire storage system.

In normal operation after the hop-count table is generated, the computing apparatuses 100-1 and 100-2 transmit a frame with a frame structure exemplarily as depicted in FIG. 3. A frame depicted in FIG. 3 has five areas: a Start Of Frame (SOF) 410, a header portion 420, a data portion 430, a Cyclic Redundancy Check (CRC) 440, and an End Of Frame (EOF) 450, in the order from top.

The SOF 410 is a portion indicative of the start of the frame. The EOF 450 is a portion indicative of the end of the frame. With these SOF 410 and EOF 450, boundaries for each frame are represented.

The header portion 420 is a portion containing control information regarding frame transfer. Specifically, the header portion 420 includes a Destination Address (DA) 421, a Source Address (SA) 422, and a hop count 423. The DA 421 and the SA 422 are addresses of the transmission destination and the transmission source of the frame, respectively, having stored therein any of the addresses of the computing apparatuses 100-1 and 100-2 and addresses of the storage media in the disk units 320. The hop count 423 indicates the number of switches (the route switch 200 and the switches 310) through which the frame goes to reach the transmission destination. In the hop-count table, the number of hops corresponding to the storage medium of the transmission destination is stored. That is, the hop count 423 stored in the frame by the computing apparatuses 100-1 and 100-2 is a predetermined number unique to a combination of the transmission source and the transmission destination of the frame, and is defined by a topology structure of the network in the storage system.

The data portion 430 is a portion including the body of data to be transmitted, having stored therein data to be written in the storage medium as the transmission destination of the frame and a command for reading data from a storage medium, for example. The CRC 440 is a protective check code for detecting an error occurring during frame transfer.

Referring back to FIG. 1, the route switch 200 is a switch connecting the computing apparatuses 100-1 and 100-2 and each of the storage devices 300, outputting a frame transmitted from any of the computing apparatuses 100-1 and 100-2 to a port connecting to the storage device 300 including the storage device as the transmission destination of the frame. Similarly, the route switch 200 outputs a frame transmitted from the storage device 300 to a port connecting to any of the computing apparatuses 100-1 and 100-2 as the transmission destination of the frame. At this time, the route switch 200 refers to the routing table generated at initialization of the network, for example, to output the frame to a port corresponding to the transmission destination address of the frame.

Also, when outputting the frame from the port, the route switch 200 subtracts 1 from the hop count stored in the header portion of the frame and then stores it again. That is, the route switch 200 subtracts 1, which corresponds to itself, from the hop count equal to the number of switches through which the frame goes to reach the transmission destination, and then transfers the frame. Therefore, the hop count of the frame output from the route switch 200 is equal to the number of switches 310 through which the frame goes after the route switch 200 to reach the transmission destination.

Here, in FIG. 1, the route switch 200 has four ports, with two ports connecting to the computing apparatuses 100-1 and 100-2 and the remaining two ports connecting to the storage devices 300. However, this is not meant to restrict the connecting relation. That is, the route switch 200 may have at least two or more ports, and which port is connected to a computing apparatus or a storage device is arbitrary. However, since a frame is transferred from a computing apparatus to a storage device in the present embodiment, it is assumed that at least one port of the route switch 200 connects to a computing apparatus, and at least one other port connects to a storage device.

The storage device 300 includes a switch 310 and a disk unit 320 in one box. With the switch 310, the storage device 300 is connected to the route switch 200 or another storage device 300. Here, in FIG. 1, a plurality of storage devices 300 corresponding to a different box may be integrally configured. Furthermore, the entire storage system including the computing apparatuses 100-1 and 100-2 and the route switch 200 may be integrally configured. Also, although each storage device 300 does not necessarily correspond to one box, it is assumed in the present embodiment that a combination of the switch 310 and the disk unit 320 directly connected to each other is disposed in the same box. That is, it is assumed that each switch 310 is disposed in the same box together with the disk unit 320 thereunder.

The switch 310 connects to the route switch 200 or another switch 310 via two cascade ports (hereinafter, abbreviated as "C ports"), and also connects to the disk unit 320 that is thereunder and in the same box via a direct port (hereinafter, abbreviated as "D port"). When the hop count of a frame input from one C port is 2 or greater, the switch 310 subtracts 1 from the hop count, and then outputs the frame from the other C port. Also, when the hop count of a frame input from one C port is 1, the switch 310 refers to the routing table to output the frame from a D port corresponding to the transmission destination address. The configuration and operation of the switch 310 will be explained in detail further below.

The disk unit 320 includes at least one storage medium, such as a hard disk drive (HDD). Each storage medium has stored therein data stored in the frame output from a D port of the switch 310. Also, when a command for reading data is stored in the frame output from the D port of the switch 310, the disk unit 320 makes data to be read that is stored in the storage medium into a frame form for output to the switch 310.

Figure 4:
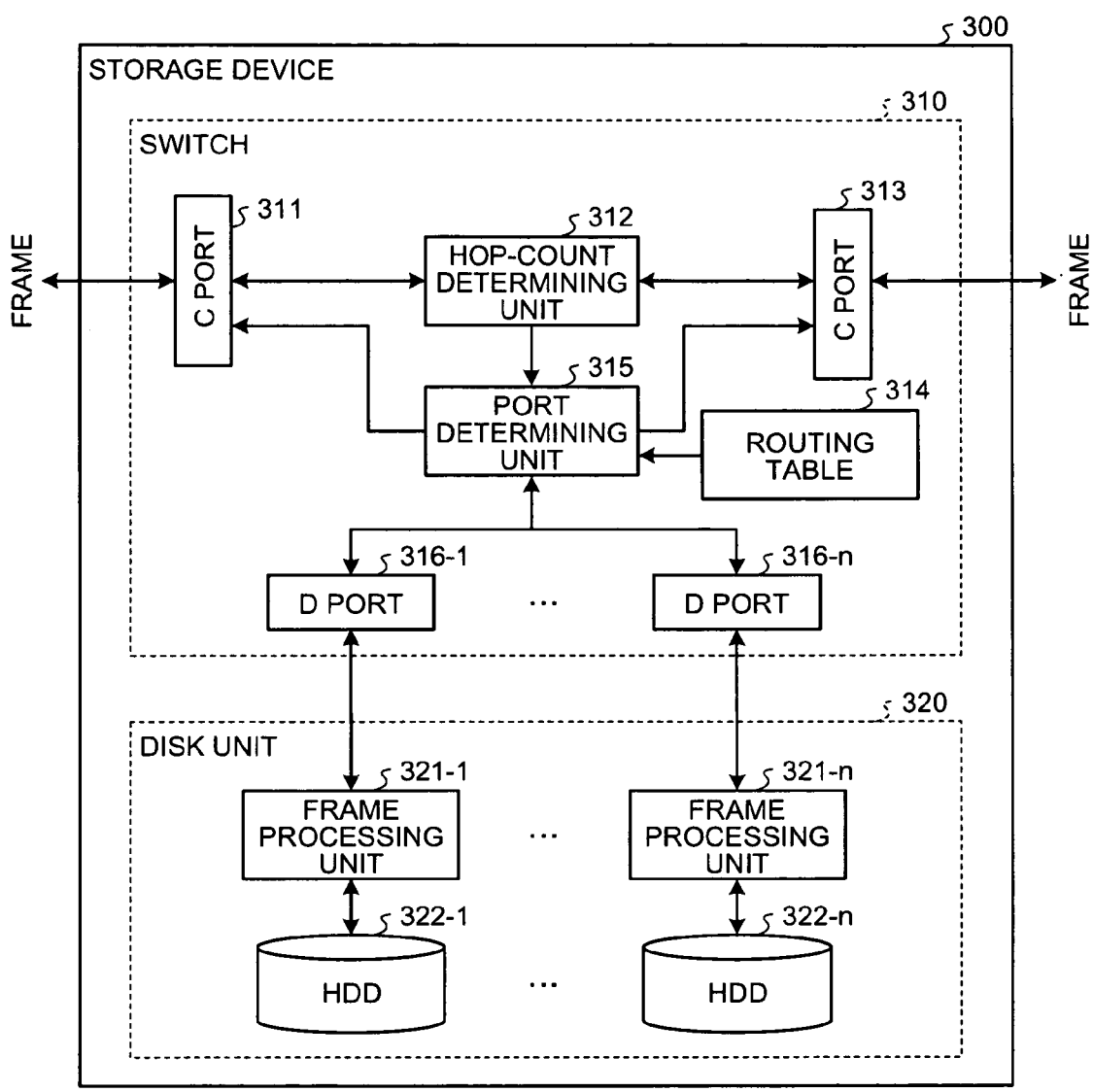
FIG. 4 is a block diagram of the configuration of main parts of a storage device according to the embodiment.

FIG. 4 is a block diagram of the configuration of main parts of the storage device 300 according to the present embodiment. In the drawing, the storage device 300 includes the switch 310 and the disk unit 320 as in FIG. 1. The switch 310 includes a C port 311, a hop-count determining unit 312, a C port 313, a routing table 314, a port determining unit 315, and D ports 316-1 to 316-n (n is an integer equal to or greater than 1). Also, the disk unit 320 includes frame processing units 321-1 to 321-n and HDDs 322-1 to 322-n.

First, the configuration of the switch 310 is explained. The C port 311 is a cascade port connecting the route switch 200 or another switch 310, inputting and outputting a frame containing data and a command. It is assumed therein that the C port 311 is connected to the route switch 200 or a switch 310 placed on a side of the storage device 300 depicted in FIG. 4 near the computing apparatuses 100-1 and 100-2.

The hop-count determining unit 312 determines whether the hop count stored in the header portion of the frame input from the C port 311 or 313 is equal to or greater than 2. When the hop count is equal to or greater than 2, the hop-count determining unit 312 subtracts 1 from the hop count, stores the hop count again in the header portion of the frame, and then outputs the frame from the C port 313 or 311 opposite to the C port in which the frame is input. That is, when the hop count is equal to or greater than 2, this means that the frame will go through two or more switches including the current switch 310 until reaching the transmission destination. Therefore, the hop-count determining unit 312 determines that the transmission destination of the frame does not belong to the disk unit 320 in the same box. Thus, the hop-count determining unit 312 subtracts 1, which corresponds to its own switch 310, from the hop count, and then outputs the frame from the C port 313 or 311 opposite to the input C port to another switch 310.

At this time, the hop-count determining unit 312 does not have to perform routing by referring to the routing table 314, and can immediately output the frame from the C port 313 or 311 only by determining the hop count stored in the header portion of the frame. Therefore, delays of the frame when passing through the switch 310 can be suppressed to minimum, thereby reducing delays in frame transfer.

On the other hand, when the hop count is 1, the hop-count determining unit 312 outputs the frame to the port determining unit 315. That is, when the hop count is 1, this means that the frame is supposed to go through only its own switch 310 until reaching the transmission destination. Therefore, the hop-count determining unit 312 determines that the transmission destination of the frame belongs to the disk unit 320 in the same box. Thus, the hop-count determining unit 312 outputs the frame to the port determining unit 315 to perform routing by referring to the routing table 314.

Furthermore, when the hop count is 0, the hop-count determining unit 312 outputs the frame to the port determining unit 315 to cause routing to be forcefully performed by referring to the routing table 314. As explained above, the computing apparatuses 100-1 and 100-2 refer to the hop-count table to store the hop count in the header portion of the frame. However, for a special frame having a special command stored in a data portion, for example, the hop count is set at 0 irrespectively of the hop-count table. That is, in place of the actual hop count stored in the hop-count table, the computing apparatuses 100-1 and 100-2 stores 0 in the header portion of the frame as forceful routing instruction information for making an instruction for forceful routing.

With this, the hop-count determining unit 312 outputs all special frames having 0 stored as the hop count to the port determining unit 315, forcefully causing routing by referring to the routing table 314. Therefore, routing by referring to the routing table in every switch, which is similar to the conventional routing, can be performed. For special frames, reliable routing can be performed. As forceful routing instruction information, blank data may be used, for example, in place of 0. In short, an invalid value different from a numerical value equal to or greater than 1 can be used as forceful routing instruction information.

The C port 313 is a cascade port connecting to another switch 310, inputting and outputting a frame containing data and a command. Here, it is assumed that the C port 313 connects to a switch 310 placed on a side of the storage device 300 depicted in FIG. 4 away from the computing apparatuses 100-1 and 100-2.

The routing table 314 has stored therein addresses of all devices in the storage system, such as the computing apparatuses 100-1 and 100-2 and the HDDs 322-1 to 322-n, and ports corresponding to these devices in association with each other. Specifically, as exemplarily depicted in FIG. 5, the routing table 314 has stored therein the addresses of the computing apparatuses 100-1 and 100-2 in association with the C port 311. Also, the routing table 314 depicted in FIG. 5 has stored therein the addresses of the disks (HDDs) 322-1 to 322-n belonging to the disk unit 320 in the same storage device 300 in association with the D ports 316-1 to 316-n connecting to the respective disks. Furthermore, the routing table 314 depicted in FIG. 5 has stored therein the addresses of disks $D_{11}$ and $D_{12}$, for example, belonging to the disk unit in another storage device in association with the C port 313.

Here, in FIG. 5, it is assumed that the disks $D_{11}$ and $D_{12}$ are disposed in a storage device placed on a side of the storage device 300 away from the computing apparatuses 100-1 and 100-2, and therefore their corresponding port is the C port 313. Similarly, the addresses of disks disposed in a storage device placed on a side of the storage device 300 near the computing apparatuses 100-1 and 100-2 are stored in association with the C port 311.

The port determining unit 315 obtains the transmission destination address from the header portion of the frame output from the hop-count determining unit 312, and then refers to the routing table 314 to determine a port corresponding to the transmission destination address as an output port of the frame. That is, with routing by using the routing table 314, the port determining unit 315 determines an output port of the frame with its hop count stored in the header portion being 1 or 0. The port determining unit 315 then outputs the frame from the determined output port.

Meanwhile, among the frames input to the port determining unit 315, the transmission destination of a frame with its hop count being 1 is absolutely any one of the HDDs 322-1 to 322-n in the storage device 300. Therefore, when the hop count is 1, the port determining unit 315 may search only the addresses of the HDDs 322-1 to 322-n in the routing table 314 for an address matching the transmission destination address of the frame. With this, even when the port determining unit 315 refers to the routing table 314 to perform routing, the search range can be restricted in advance to reduce the time required for searching for the transmission destination address. As a result, delays in frame transfer can be reduced.

Also, at initialization of the network, for example, the port determining unit 315 generates a hop-count table when a frame output from the disk unit 320 is transferred to any of the computing apparatuses 100-1 and 100-2. That is, from the hop-count table generated by the computing apparatuses 100-1 and 100-2, the port determining unit 315 extracts a hop count corresponding to each of the HDDs 322-1 to 322-n in the same storage device 300 as a hop count for each of the computing apparatuses 100-1 and 100-2. Then, as exemplarily depicted in FIG. 6, the port determining unit 315 associates the extracted hop count with each of the computing apparatuses 100-1 and 100-2, and stores them as a hop-count table.

The hop-count table stored in the port determining unit 315 is used when data stored in any of the HDDs 322-1 to 322-n to any of the computing apparatuses 100-1 and 100-2. That is, the port determining unit 315 obtains the transmission destination address from the header portion of the frame input to its own switch 310 via any of the D ports 316-1 to 316-n, and refers to the hop-count table to store the hop count corresponding to the transmission destination address in the header portion of the frame. Then, the port determining unit 315 refers to the routing table 314 to determine a port corresponding to the transmission destination address of the frame as an output port of the frame. Here, since the transmission destination of the frame is either of the computing apparatus 100-1 or 100-2, the C port 311 is determined as an output port. The port determining unit 315 then subtracts 1, which corresponds to its own switch 310, from the hop count of the header portion, and then outputs the frame from the C port 311 determined as the output port.

The D ports 316-1 to 316-n are direct ports connecting to the HDDs 322-1 to 322-n of the disk unit 320, respectively, inputting and outputting a frame containing data and a command. That is, the D ports 316-1 to 316-n connect to the HDDs 322-1 to 322-n thereunder, exchanging data and a command with the HDDs 322-1 to 322-n.

Next, the configuration of the disk unit 320 is explained. The frame processing units 321-1 to 321-n perform a predetermined process on a frame output via the D ports 316-1 to 316-n of the switch 310, respectively. Specifically, the frame processing units 321-1 to 321-n use a protective check code, such as CRC, added to the end of the frame to confirm that no error has occurred in the frame during transfer. The frame processing units 321-1 to 321-n then write data stored in the data portion of the frame in the relevant one of the HDDs 322-1 to 322-n.

Also, when a command of instruction for reading data is stored in the data portion of the frame, the frame processing units 321-1 to 321-n read data from the relevant one of the HDDs 322-1 to 322-n, and then makes the read data into a frame form. At this time, the frame processing units 321-1 to 321-n generate a frame with a frame structure (refer to FIG. 3) similar to that of the frame to be transmitted by the computing apparatuses 100-1 and 100-2. However, for the hop count of the header portion, as explained above, the port determining unit 315 later refers to the hop-count table for storage. The frame processing units 321-1 to 321-n input a frame containing the data read from any of the HDDs 322-1 to 322-n to the switch 310 via the D ports 316-1 to 316-n.

The HDDs 322-1 to 322-n are storage media having data stored therein, each provided with an address uniquely identifying every storage medium in the storage system.

Next, the operation of the switch 310 configured as above is explained with reference to a flow diagram depicted in FIG. 7. In the following, the operation at initialization of the network and the operation at normal operation of the network are both explained. Also, as the operation at normal operation of the network, mainly explained is an operation when a frame is transmitted from the computing apparatus 100-1 to any of the storage media in the storage system.

At initialization of the network, the routing table 314 in which the addresses of the computing apparatuses 100-1 and 100-2 and the storage media and the output ports are associated with each other is generated in the switch 310 (step S101). The routing table 314 is generated by every switch in the storage system including the switch 310. Then, the routing table generated by each switch is referred to by the computing apparatuses 100-1 and 100-2, and a hop-count table retaining the hop count from each of the computing apparatuses 100-1 and 100-2 to each storage medium is generated.

Information about the hop-count table generated by each of the computing apparatuses 100-1 and 100-2 is also reported to the switch 310. By the port determining unit 315, a hop-count table retaining the hop count from the HDDs 322-1 to 322-n to the computing apparatuses 100-1 and 100-2 is generated (step S102). That is, by the port determining unit 315, the number of switches through which the frame containing the data read from any of the HDDs 322-1 to 322-n goes to reach the relevant one of the computing apparatuses 100-1 and 100-2 is stored in the hop-count table. With this, normal operation of the network becomes possible, thereby starting writing of data in a storage medium and reading of data from a storage medium by the computing apparatuses 100-1 and 100-2.

At normal operation of the network, a frame containing data and a command is transmitted from any of the computing apparatus 100-1. The transmitted frame is received by the C port 311 of the switch 310 via a switch such as the route switch 200 (step S103). The received frame is output to the hop-count determining unit 312. By the hop-count determining unit 312, it is determined whether the hop count stored in the header portion of the frame is equal to or greater than 2 (step S104).

When it is determined that the hop count is equal to or greater than 2 (Yes at step S104), the hop-count determining unit 312 subtracts 1 from the hop count stored in the header portion of the frame (step S105), and then the frame is output to the C port 313 (step S106). That is, when the hop count of the frame input from the C port 311 to the switch 310 is equal to or greater than 2, the transmission destination of this frame is none of the HDDs 322-1 to 322-n in the storage device 300. Therefore, the frame is immediately output to another switch via the C port 313. At this time, the hop-count determining unit 312 subtracts 1, which corresponds to its own switch 310, from the hop count, and the frame with its hop count updated by subtraction is then output to another switch.

In this manner, when the hop count is equal to or greater than 2, routing by referring to the routing table 314 is not performed, thereby suppressing the time required for the frame to pass through the switch to minimum. Therefore, delays in frame transfer can be reduced. Also, since 1, which corresponds to its own switch 310, is subtracted from the hop count, the hop count of the frame output from the switch 310 is equal to the number of switches through which the frame goes after its own switch 310 to reach the transmission destination. As a result, even in a switch through which the frame goes after the switch 310, routing according to the hop count in a manner similar to that in the switch 310 can be performed.

On the other hand, as a result of determining whether the hop count is equal to or greater than 2, when the hop count is smaller than 2 (No at step S104), the hop-count determining unit 312 subsequently determines whether the hop count is 1 (step S107).

When it is determined that the hop count is 1 (Yes at step S107), the frame is output from the hop-count determining unit 312 to the port determining unit 315. The port determining unit 315 refers to the routing table 314 to determine a D port to output the frame (step S108). That is, by the port determining unit 315, a port stored in the routing table 314 in association with the transmission destination address of the frame is determined as an output port. Here, since the hop count is 1, the transmission destination of the frame is any of the HDDs 322-1 to 322-n. By the port determining unit 315, any of the D ports 316-1 to 316-n is determined as an output port.

At this time, since the transmission destination of the frame is restricted to any of the HDDs 322-1 to 322-n, a search may be made by the port determining unit 315 in which only part of the addresses in the routing table 314 are taken as a search range. Specifically, with only the addresses of the HDDs 322-1 to 322-n being taken as a search range, an address matching the transmission destination address of the frame may be searched for. With this, even when the hop count is 1, the time required for the frame to pass through the switch 310 can be reduced.

After the output port is determined, the frame is output to the D port determined as the output port (step S109), and is then output via the D port to the disk unit 320. In the disk unit 320, by any of the frame processing units 321-1 to 321-n corresponding to the D port as the output port, processes are performed, such as frame error detection. Then, for the storage device (any of the HDDs 322-1 to 322-n) corresponding to the D port as the output port, writing of data stored in the data portion of the frame and reading of data specified by the command stored in the data portion of the frame are performed.

Also, as a result of determining whether the hop count is 1, when it is determined that the hop count is not 1 (No at step S107), the hop count has an invalid value, such as 0, corresponding to the forceful routing information. Therefore, the frame is output from the hop-count determining unit 312 to the port determining unit 315. By the port determining unit 315, routing by referring to the routing table 314 is forcefully performed (step S110). That is, by the port determining unit 315, a port stored in the routing table 314 in associated with the transmission destination address of the frame is determined as an output port. Here, since the hop count has an invalid value, such as 0, the transmission destination of the frame is not restricted to any of the HDDs 322-1 to 322-n, but any of the C port 313 other than the C port 311, which is an input port, and the D ports 361-1 to 316-n is determined as an output port by the port determining unit 315.

At this time, unlike the case where the hop count is 1, the transmission destination of the frame is not restricted. Therefore, by the port determining unit 315, all addresses in the routing table 314 are taken as a search range for searching. However, the hop count has an invalid value, such as 0, only in rare cases where, for example, the frame includes a special command, or any of the storage devices in the storage system does not include a switch similar to the switch 310. Therefore, forceful routing never frequently occurs. With the operation when the hop count is equal to or greater than 1, the speed of reading and writing data can be reliably increased.

After determining the output port, the frame is transferred from the C port 313 or any of the D ports 316-1 to 316-n as the output port to another switch or the disk unit 320 (step S111). When the frame is transferred to another switch, since the hop count is 0, routing using the routing table is forcefully performed also in the other switch. On the other hand, when the frame is transferred to the disk unit 320, as with the case where the hop count is 1, data writing and reading is performed for the HDDS 322-1 to 322-n.

Although not shown in FIG. 7, when the data read from any of the HDDs 322-1 to 322-n is transmitted to any of the computing apparatuses 100-1 and 100-2, the read data is made into a frame form by the relevant one of the frame processing units 321-1 to 321-n. Then, when the obtained frame is input to the switch 310 via any of the D ports 316-1 to 316-n, the hop-count table generated at initialization of the network is referred to by the port determining unit 315, and a hop count corresponding to the computing apparatus of the transmission destination is stored in the header portion of the frame. Furthermore, by the port determining unit 315, the routing table 314 is referred to, and an output port corresponding to the computing apparatus of the transmission destination of the frame is determined. Here, both of the addresses of the computing apparatuses 100-1 and 100-2 are associated with the C port 311, and therefore the C port 311 is determined by the port determining unit 315 as the output port. Then, by the port determining unit 315, 1, which corresponds to its own switch 310, is subtracted from the hop count in the header, and then the frame is output from the C port 311.

Next, frame routing according to the present embodiment is specifically explained with an example. FIG. 8 is a drawing that schematically depicts a connection of storage devices according to the present embodiment. In the drawing, two storage devices 300-1 and 300-2 are connected together via switches 310-1 and 310-2. These switches 310-1 and 310-2 each have ports $P_0$ and $P_{n+1}$ as cascade ports and ports $P_1$ to $P_n$ as direct ports. It is assumed in FIG. 8 that the computing apparatus that transmits a frame is connected to the switch 310-1 at the port $P_0$ side.

The switch 310-1 is connected to the switch 310-2 via the port $P_{n+1}$, and is connected to disks $D_1$ to $D_n$ that belong to a disk unit 320-1 via the ports $P_1$ to $P_n$, respectively. Similarly, the switch 310-2 is connected to the switch 310-1 via the port $P_0$, and is connected to disks $D_{n+1}$ to $D_{2n}$ that belong to a disk unit 320-2 via the ports $P_1$ to $P_n$, respectively.

When such a connecting relation holds, the switches 310-1 and 310-2 each generate and retain a routing table as depicted in FIG. 9. That is, the switch 310-1 retains a routing table containing an entry 501 that associates the computing apparatus with the port $P_0$, an entry 502 that associates the disks $D_1$ to $D_n$ with the ports $P_1$ to $P_n$, and an entry 503 that associates the disks $D_{n+1}$ to $D_{2n}$ with the port $P_{n+1}$. Also, the switch 310-2 retains a routing table containing an entry 511 that associates the computing apparatus with the port $P_0$, an entry 512 that associates the disks $D_1$ to $D_n$ with the port $P_0$, and an entry 513 that associates the disks $D_{n+1}$ to $D_{2n}$ with the ports $P_1$ to $P_n$.

Here, as a first example, routing is explained when the computing apparatus transmits a frame to the disk $D_{2n}$ of the storage device 300-2.

A frame transmitted from the computing apparatus is input to the switch 310-1 via the port $P_0$. At the switch 310-1, it is determined whether the hop count stored in the header portion of the frame is equal to or greater than 2. Since the transmission destination of the frame is the disk $D_{2n}$ connecting to the switch 310-2, when the frame is input in the switch 310-1, 2 is stored in the header portion of the frame as the hop count. With the hop count being equal to or greater than 2, the switch 310-1 immediately outputs the frame from the cascade port $P_{n+1}$ different from the cascade port $P_0$ in which the frame was input.

That is, the switch 310-1 subtracts 1, which corresponds to itself 310-1, from the hop count without referring to the routing table depicted in FIG. 9, and then outputs the frame from the port $P_{n+1}$. At this time, since 1 is subtracted from the hop count, the hop count of the frame output from the port $P_{n+1}$ is 1.

The frame output from the switch 310-1 is input to the switch 310-2 via the port $P_0$. At the switch 310-2, as with the switch 310-1, it is determined whether the hop count stored in the header portion of the frame is equal to or greater than 2. As explained above, when the frame is input in the switch 310-2, 1 is stored as the hop count in the header portion of the frame. Therefore, since the hop count is smaller than 2, the switch 310-2 refers to the routing table depicted in FIG. 9 to perform routing.

That is, the switch 310-2 searches the routing table for an address matching the transmission destination address stored in the header portion of the frame, and determines a port corresponding to the relevant address as an output port of the frame. At this time, since the hop count is 1, the transmission destination of the frame is absolutely any one of the disks $D_{n+1}$ to $D_{2n}$. Thus, only the entry 513 in the routing table is within a search range. That is, the entries 511 and 512 are excluded from the search range, and the transmission destination address of the frame is searched for only from the addresses of the disks $D_{n+1}$ to $D_{2n}$. Therefore, the time required to search for an address matching the transmission destination address of the frame in the routing table can be reduced.

As a result of the search for the transmission destination address, when the port $P_n$ corresponding to the disk $D_{2n}$ is determined as the output port, the frame is output from the port $P_n$ as the output port, and then, for example, data stored in the data portion of the frame is written in the disk $D_{2n}$. In the procedure so far, at the switch 310-1, a search for the transmission destination address by using the routing table is not required at all. At the switch 310-2, a search for the transmission destination address is performed with the entry 513, which is part of the routing table, being taken as a search range. Therefore, when compared with the case where a search for the transmission destination address is performed at each of the switches 310-1 and 310-2 with all entries in the routing table being taken as a search range, it can be known that delays in frame transfer is significantly reduced.

Next, as a second example, routing is explained when the computing apparatus transmits a frame to the disk $D_n$ in the storage device 300-1.

A frame transmitted from the computing apparatus is input to the switch 310-1 via the port $P_0$. At the switch 310-1, it is determined whether the hop count stored in the header portion of the frame is equal to or greater than 2. Since the transmission destination of the frame is the disk $D_n$ connected to the switch 310-1, when the frame is input to the switch 310-1, 1 is stored in the header portion of the frame as the hop count. With the hop count being smaller than 2, the switch 310-1 refers to the routing table depicted in FIG. 9 to perform routing.

That is, the switch 310-1 searches the routing table for an address matching the transmission destination address stored in the header portion of the frame, and determines a port corresponding to the relevant address as an output port of the frame. At this time, since the hop count is 1, the transmission destination of the frame is absolutely any of the disks $D_1$ to $D_n$. Thus, only the entry 502 in the routing table is within a search range. That is, the entries 501 and 503 are excluded from the search range, and the transmission destination address of the frame is searched for only from the addresses of the disks $D_1$ to $D_n$. Therefore, the time required to search for an address matching the transmission destination address of the frame in the routing table can be reduced.

As a result of the search for the transmission destination address, when the port $P_n$ corresponding to the disk $D_n$ is determined as the output port, the frame is output from the port $P_n$ as the output port, and then, for example, data stored in the data portion of the frame is written in the disk $D_n$. In the procedure so far, at the switch 310-1, a search for the transmission destination address is performed with the entry 502, which is part of the routing table, being taken as a search range. Therefore, when compared with the case where a search for the transmission destination address is performed at each of the switch 310-1 with all entries in the routing table being taken as a search range, it can be known that delays in frame transfer is significantly reduced.

As explained above, according to the present embodiment, the hop count equal to the number of switches through which the frame goes to reach the transmission destination is stored in the header portion of the frame. At each switch, when the hop count is equal to or greater than 2, 1 is subtracted from the hop count, and then the frame is unconditionally transferred to an adjacent switch. When the hop count is 1, the routing table is referred to, and a search for an address matching the transmission destination address of the frame is performed with the addresses of the storage media disposed in the same storage device being taken as a search range. Therefore, when the hop count of the frame input to the switch is equal to or grater than 2, this frame is immediately output from the switch. When the hop count of the frame input to the switch is 1, an output port of the frame is quickly determined. Therefore, the time required for the frame to pass through the switches on the transfer route can be reduced. As a result, delays in frame transfer can be reduced, and the speed of writing and reading data to and from a storage medium can be increased.

Here, in the present embodiment, 1 is subtracted by the hop-count determining unit 312 of the switch 310 from the hop count stored in the header portion of the frame. Alternatively, the present invention can be achieved by adding 1 to the hop count every time the frame passes through a switch. In this case, at each switch, the hop count stored in the header portion of the frame is compared with a threshold, and only at a switch where the hop count and the threshold are equal to each other, routing using the routing table is performed.

Figure 10:
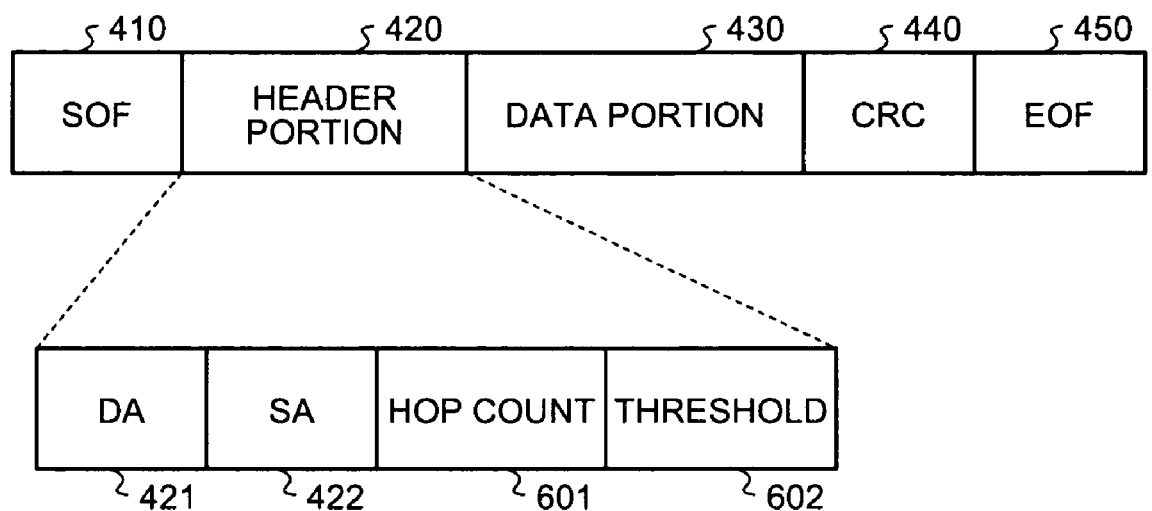
FIG. 10 is a drawing of an example of a frame structure according to another embodiment.

Specifically, the frame structure when the hop count is increased is exemplarily as depicted in FIG. 10. In FIG. 10, portions identical to those in FIG. 3 are provided with the same reference numerals. The difference from the case where the hop count is decreased (FIG. 3) is that the header portion 420 of the frame includes a hop count 601 and a threshold 602.

The hop count 601 indicates the number of switches through which the frame has passed so far after being transmitted. That is, when the frame is first transmitted, 0 is stored in the hop count 601. Every time the frame passes through a switch, 1 is added to the hop count 601.

The threshold 602 indicates a total number of switches through which the frame goes to reach the transmission destination. In the hop-count table, the hop count corresponding to the storage medium of the transmission destination is stored. That is, when the hop count is increased, a value equal to the value of the hop count 423 when the hop count is decreased (FIG. 3) is stored in the threshold 602.

With such a frame structure, at the switch of each storage medium, when a frame is input, 1 is added to the hop count 601 of the header portion. Then, the hop count 601 after addition and the threshold 602 are compared with each other. When the hop count 601 is smaller than the threshold 602, the frame is unconditionally transferred to an adjacent switch. On the other hand, when the hop count 601 is equal to the threshold 602, the routing table is referred to, and an address matching the transmission destination address of the frame is searched for with the addresses of the storage media disposed in the same storage device being taken as a search range.

In this manner, when 1 is added to the hop count, a threshold of the hop count is stored in the header portion of the frame. With each switch comparing the hop count and the threshold each other, effects similar to those in the embodiment explained above can be achieved. That is, in either of the case where 1 is subtracted from the hop count and the case where 1 is added to the hop count, the hop count stored in the header portion of the frame indicates the number of switches through which the frame passes while being transferred from the transmission source. Also, a determination for the hop count is to determine whether the frame has already passed through the predetermined number of switches disposed between the transmission source and the transmission destination of the frame on the topology structure of the network.

Also, in the embodiment explained above, at initialization of the network, a routing table is generated in which the addresses of all computing apparatus and storage media in the storage system and the output ports are associated with each other. However, at a switch where the hop count of the frame is determined as 1, only the addresses of the storage media disposed in the same storage device are taken as a search range. Therefore, a routing table may be generated in which the addresses of these storage media and the output ports are associated with each other. That is, in routing using the routing table at the switch, the addresses required are those of the storage media disposed in the same box as the switch. Therefore, the present invention can be achieved even when a routing table regarding only the addresses of the storage media disposed in the same box is generated by each switch.

According to the embodiments above, if the frame has not yet gone through the predetermined number of switch devices, the frame can be unconditionally output to an adjacent switch device, eliminating a process of determining a port. In other words, in a switch device other than a switch device directly connecting to the transmission destination of the frame, a port to output the frame can be determined only by determining the number of switch devices through which the frame has gone. Therefore, delays in frame transfer can be reduced, and the speed of writing and reading data to and from a storage medium can be increased.

According to the embodiments disclosed herein, delays in frame transfer can be reduced, and the speed of writing and reading data to and from a storage medium can be increased.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A switch device comprising:
two cascade ports each connected to another switch device to receive from or transmit to the another switch device a frame;
at least one direct port connected to a storage medium to transmit the frame to the storage medium; and
a processor that
determines whether a hop count, which corresponds to a number of switch devices that a frame input from one of the cascade ports has gone through, is equal to a predetermined number,
outputs the frame from the other cascade port when it is determined that the hop count is not equal to the predetermined number, and
determines a direct port for outputting the frame when it is determined that the hop count is equal to the predetermined number.

2. The switch device according to claim 1, wherein
the processor updates the hop count to a new value when it is determined that the hop count is not equal to the predetermined number, and outputs the frame from the other cascade port after the hop count is updated.

3. The switch device according to claim 1, wherein
the processor refers to hop-count information stored in the frame to determine whether the hop count, which is set in a transmission source of the frame to be a value corresponding to a total number of switch devices placed on a transfer route for the frame and which is subtracted every time the frame goes through one of the switch devices, is equal to 1, and
when it is determined that the hop count is greater than 1, the processor outputs the frame from the other cascade port.

4. The switch device according to claim 3, wherein
the processor outputs the frame from the other cascade port after 1 is subtracted from the hop count indicated by the hop-count information stored in the frame.

5. The switch device according to claim 1, wherein
the processor refers to hop-count information and threshold information stored in the frame to determine whether the hop count, which is set in a transmission source of the frame to be zero and to which 1 is added every time the frame goes through one of switch devices, is equal to a threshold corresponding to a total number of the switch devices placed on a transfer route for the frame, and when it is determined that the hop count is less than the threshold, the processor outputs the frame from the other cascade port.

6. The switch device according to claim 5, wherein after 1 is added to the hop-count information stored in the frame, the processor determines whether the hop count after the addition of 1 is equal to the threshold.

7. The switch device according to claim 1, further comprising a storage unit that has stored therein an address of every storage medium connected to the direct port in association with the direct port connected to each storage medium, and wherein the processor determines a direct port stored in the storage unit in association with an address of transmission destination of the frame as an output port of the frame.

8. The switch device according to claim 7, wherein the storage unit has stored therein an address of a device not connected to the direct port in association with either one of the two cascade ports.

9. The switch device according to claim 8, wherein the processor searches only direct ports from among the at least one direct port and the cascade ports stored in the storage unit, as a search range for the output port corresponding to the address of the transmission destination of the frame.

10. The switch device according to claim 1, wherein when the frame includes forceful-routing instruction information, the processor determines a port from which the frame is output, from among the two cascade ports and the at least one direct port irrespectively of determination result related to the hop count.

11. A storage system comprising:
a plurality of switch devices connected to each other to transfer a frame; and
storage media connected to each of the switch devices, wherein each switch device comprises:
    two cascade ports each connected to another switch device to receive from or transmit to the another switch device the frame;
    at least one direct port connected to one of the storage media to transmit the frame to the storage media;
    a processor that determines whether a hop count, which corresponds to a number of switch devices that a frame input from one of the cascade ports has gone through, is equal to a predetermined number, outputs the frame from the other cascade port when it is determined that the hop count is not equal to the predetermined number, and determines a direct port for outputting the frame when it is determined that the hop count is equal to the predetermined number,
wherein the storage media store data included in the frame output from the direct port determined by the processor.

12. A routing method of a switch device that includes two cascade ports each connected to another switch device, and at least one direct port connected to a storage medium, the method comprising:
    determining whether a hop count, which corresponds to a number of switch devices that a frame input from one of the cascade ports has gone through, is equal to a predetermined number;
    outputting the frame from the other cascade port when it is determined that the hop count is not equal to the predetermined number; and
    selecting a direct port for outputting the frame when it is determined that the hop count is equal to the predetermined number.

13. The routing method according to claim 12, further comprising:
    updating the hop count to a new value when it is determined that the hop count is not equal to the predetermined number, wherein
    the outputting includes outputting the frame from the other cascade port after the hop count is updated.

14. The routing method according to claim 12, wherein the determining includes referring to hop-count information stored in the frame to determine whether the hop count, which is set in a transmission source of the frame to be a value corresponding to a total number of switch devices placed on a transfer route for the frame and which is subtracted every time the frame goes through one of the switch devices, is equal to 1, and outputting, when it is determined that the hop count is greater than 1, the frame from the other cascade port.

15. The routing method according to claim 14, wherein the determining includes outputting the frame from the other cascade port after 1 is subtracted from the hop count indicated by the hop-count information stored in the frame.

16. The routing method according to claim 12, wherein the determining includes referring to hop-count information and threshold information stored in the frame to determine whether the hop count, which is set in a transmission source of the frame to be zero and to which 1 is added every time the frame goes through one of switch devices, is equal to a threshold corresponding to a total number of the switch devices placed on a transfer route for the frame, and outputting, when it is determined that the hop count is less than the threshold, the frame from the other cascade port.

17. The routing method according to claim 16, wherein the determining includes determining, after 1 is added to the hop-count information stored in the frame, whether the hop count after the addition of 1 is equal to the threshold.

18. The routing method according to claim 12, wherein the selecting includes selecting a direct port stored in a storage unit in association with an address of transmission destination of the frame as an output port of the frame, the storage unit storing therein an address of every storage medium connected to the direct port in association with the direct port connected to each storage medium.

19. The routing method according to claim 18, wherein the storage unit has stored therein an address of a device not connected to the direct port in association with either one of the two cascade ports.

20. The routing method according to claim 19, wherein the selecting includes searching only direct ports from among the at least one direct port and the cascade ports stored in the storage unit, as a search range for the output port corresponding to the address of the transmission destination of the frame.

21. The routing method according to claim 12, wherein the selecting includes selecting, when the frame includes forceful-routing instruction information, a port from which the frame is output, from among the two cascade ports and the at least one direct port irrespectively of determination result at the determining.

* * * * *